United States Patent [19]
Jones

[11] Patent Number: 5,649,991
[45] Date of Patent: Jul. 22, 1997

[54] INDIVIDUAL SECTION GLASS CONTAINER FORMING MACHINE

[75] Inventor: Stanley Peter Jones, Doncaster, United Kingdom

[73] Assignee: Emhart Glass Machinery Investments Inc., Wilmington, Del.

[21] Appl. No.: 536,823

[22] Filed: Sep. 29, 1995

[30]     Foreign Application Priority Data

Oct. 4, 1994 [GB] United Kingdom ............ 9420014

[51] Int. Cl.$^6$ ........................................ C03B 9/13
[52] U.S. Cl. ............................ 65/229; 65/230; 65/235; 65/240; 65/241; 65/264; 425/534; 425/539; 425/522; 425/528
[58] Field of Search ................ 65/229, 230, 235, 65/236, 239, 240, 241, 263, 264, 29.1, 68, 76, 79, 82, 265, 267, 261; 425/522, 528, 534, 539; 264/512, 523

[56]     References Cited

U.S. PATENT DOCUMENTS

| | | | |
|---|---|---|---|
| 2,151,876 | 3/1939 | Wadman | 65/235 |
| 3,914,120 | 10/1975 | Foster | 65/229 |
| 4,058,388 | 11/1977 | Zappia | 65/229 |
| 4,162,911 | 7/1979 | Mallory | 65/241 |
| 4,255,178 | 3/1981 | Braithwaite | 65/230 |
| 4,255,179 | 3/1981 | Foster | 65/229 |
| 4,276,076 | 6/1981 | Fenton | 65/229 |
| 4,325,725 | 4/1982 | Fujimoto | 65/230 |
| 4,599,099 | 7/1986 | Jones | 65/79 |
| 4,775,403 | 10/1988 | Braithwaite | 65/241 |
| 4,810,278 | 3/1989 | Braithwaite | 65/267 |

*Primary Examiner*—Steven P. Griffin
*Attorney, Agent, or Firm*—Spencer T. Smith

[57]     ABSTRACT

A section of an I.S. machine for manufacturing glass containers. A gob of molten glass is delivered to a blank mold to be formed into a parison. The formed parison is then transferred to a blow mold so that an initial blowing operation can be performed to stabilize the parison. The blow mold with the stabilized parison is then transferred linearly to a final station where the parison is blown into the container.

5 Claims, 8 Drawing Sheets

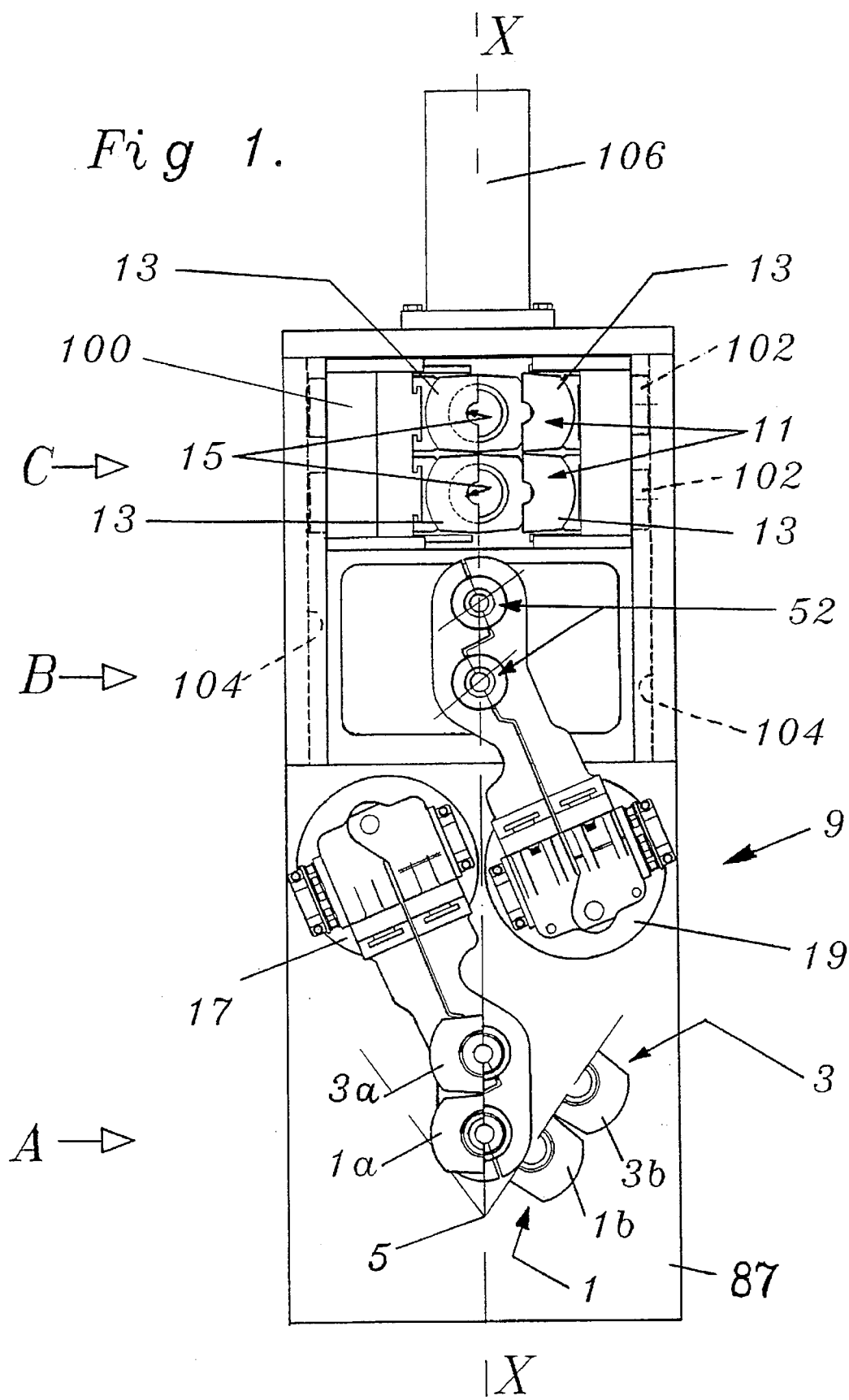

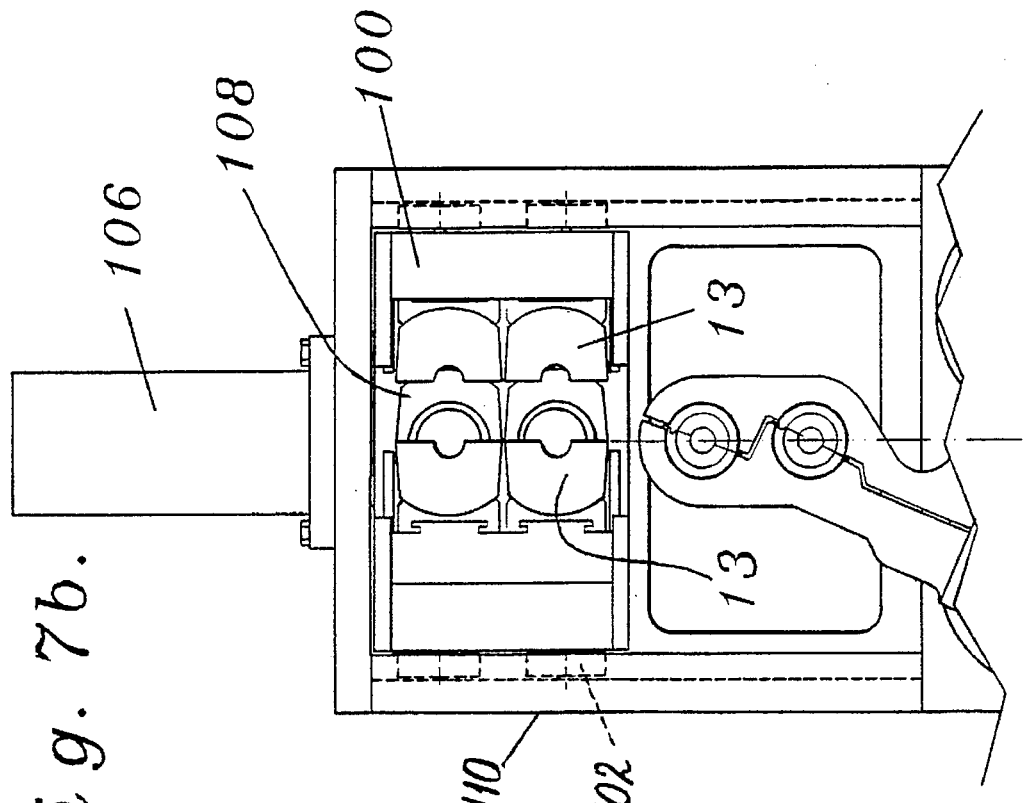
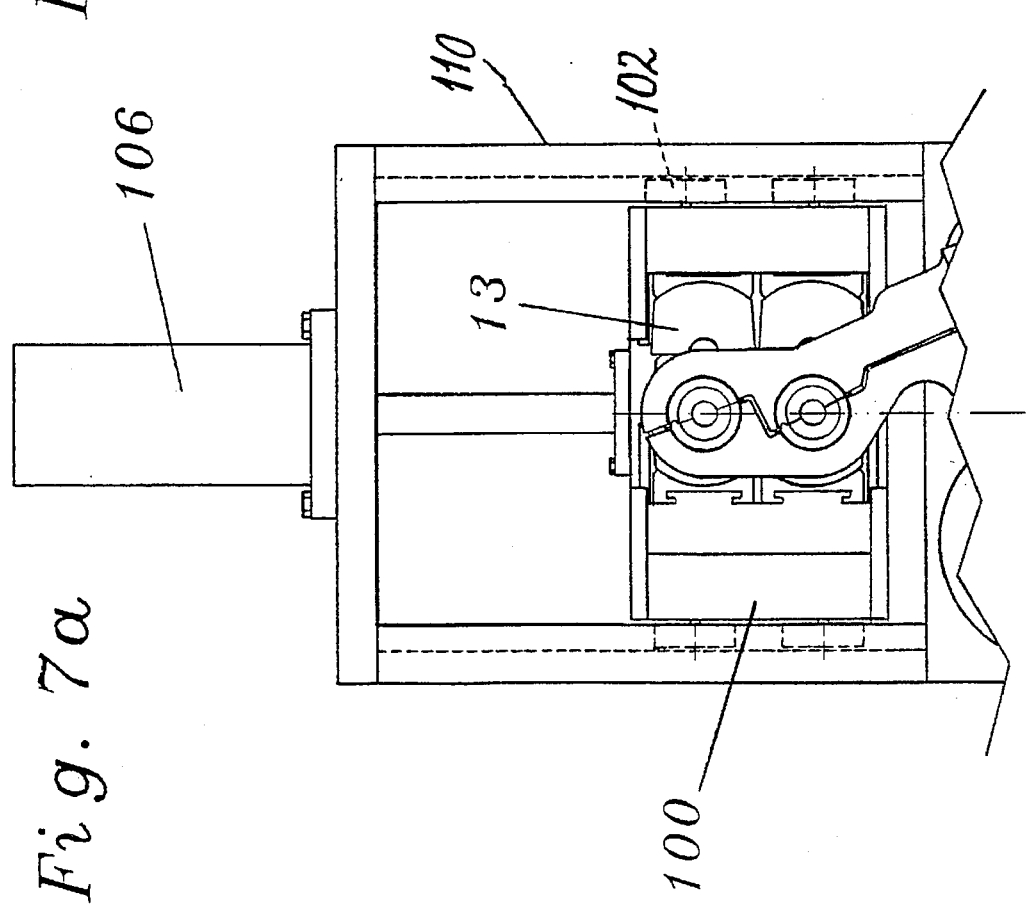

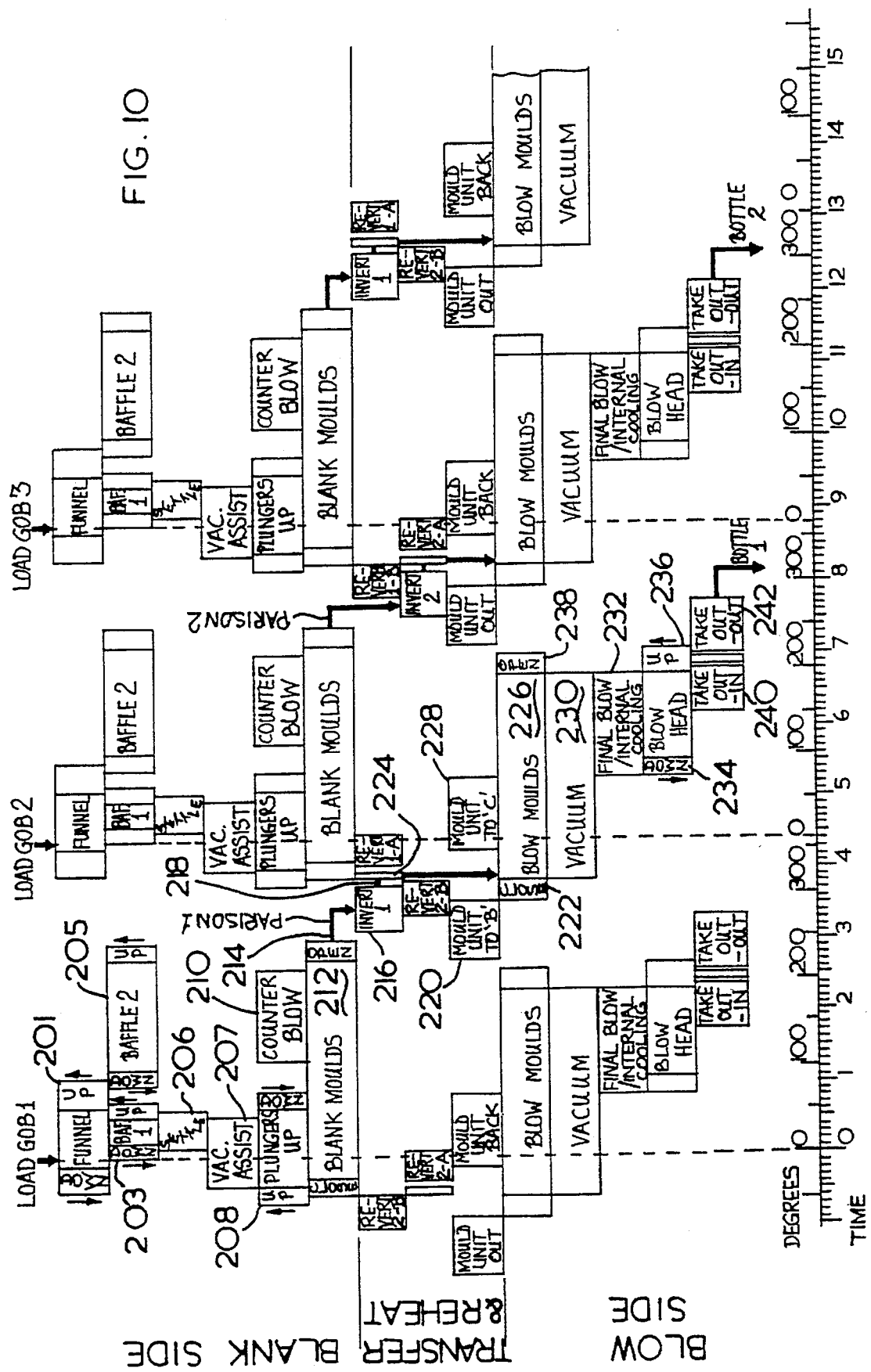

INDIVIDUAL SECTION GLASS CONTAINER FORMING MACHINE

This invention is concerned with improvements in the manufacture of glass containers.

BACKGROUND TO THE INVENTION

A conventional I.S. glass container manufacturing machine comprises a series of sections arranged along side each other and operating out of phase with each other. Each section is equipped with a single parison transfer invert mechanism carrying one or more neck-rings. Taking single gob operation as an example, the machine cycle commences with the neck-ring in a reverted position and the parison mould closed around it. A charge or gob of glass enters the upper end of the parison mould and is blown or pressed into a parison shape with some glass being forced into the space between the neck-ring and a plunger to form a finish end portion of the final container. The parison mould then opens leaving the parison held by its finish end in the neck-ring. The invert mechanism then operates to carry the parison from the parison forming station and to invert it into the blow mould station where the blow mould closes around it. The neck-ring is then opened, dropping the parison into the blow mould where it is supported by a bead formed on the finish. The invert mechanism returns the neck-ring to the parison forming station and the parison mould closes around it ready for the next charge of glass. Meanwhile the parison hanging in the blow mould is reheating, that is to say the outer, cooler, skin of glass which gives it its shape retaining ability and thus allows it to be transferred without excessive distortion from the blank mould to the blow mould, receives heat from the hotter interior glass and softens. This allows the body of the parison to stretch under its own weight and its outer surface to achieve a condition at which the parison can be blown into a final container. If blowing takes place before adequate reheating has occurred, a defective container will be formed with an unsatisfactory glass distribution.

Various steps have been taken in recent years to attempt to increase the speed of the container forming process, including the introduction of axial mould cooling methods and the reduction of the wall thickness of the finished container. There are however two problems which are still encountered.

One problem is that of achieving a sufficient cooling of the finish end portion of a parison so that it is sufficiently strong to withstand the further processing steps without distortion. Such cooling is best achieved through an increase in neck-ring contact time, but in a conventional I.S. machine increase in such time also increases the cycle time of the section. In U.S. Pat. No. 5,547,485 a solution to this problem has been proposed by the use of two neck-ring mechanisms within the space available in a normal I.S. section. This arrangement allows one mechanism to remain in position with the parison supported in the neck-ring mechanism, the finish cooling while the remainder of the parison reheats and stretches, while the other neck-ring mechanism moves towards a blank station of the section for the forming of the next charge of glass into a parison. This arrangement not only provides an increased neck-ring contact time, but allows for better utilisation of the parison moulds, as the formation of the next charge of glass into a parison can begin sooner with the second neck-ring mechanism in place against the parison moulds while the previous parisons are still supported by the first neck-ring mechanism.

A second problem which arises when attempting to increase the speed of a section and to decrease the weight of the formed containers, is that the time which is allowed for reheating becomes a disproportionate part of the total cycle. For example, to manufacture very light containers a parison is required which is, proportionately, shorter than normal in relation to the final container. Such a parison requires a correspondingly longer time to reheat and stretch before it can be satisfactorily blown, and it is found that the speed of the section has to be reduced to allow the blow mould enough time to perform its functions of holding the parison to allow it to reheat and subsequently blowing and cooling the finally formed container.

It has been proposed to overcome this problem by the introduction of an intermediate station at which the parison could reheat before being transferred to the blow moulds for final forming. In U.S. Pat. No. 4,010,021 the parisons were formed in an upright condition and transferred horizontally to an intermediate station where a set of intermediate jaws closed around finish end portions of the parisons, allowing the neck-ring mechanism to release the parisons and return to the blank station for the formation of the next parisons. After reheating of the parisons had taken place, the intermediate jaws were moved horizontally, carrying the reheated parisons to the final forming station where they were released into the blow moulds for final forming. One feature of this machine was that the timing of the mechanisms in the parison forming stage was effectively decoupled from the timing of the mechanisms in the final forming stage, thus allowing the reheat time to be varied without requiring retiming of the mechanisms operating at these two stages.

However this mechanism suffered from some disadvantages. Firstly, the neck-ring contact time with the finish end portions of the parisons was necessarily short. Consequently there tended to be inadequate cooling of the finish end portions of the parisons, resulting in damage and distortion firstly when the parisons were transferred from the neck-ring mechanism to the intermediate jaws and again when the reheated parisons were transferred from the intermediate jaws to the blow moulds. Secondly, after reheating the parisons were very soft, and liable to rock or distort on movement of the intermediate jaws to carry the reheated parisons from the intermediate station to the final forming station. As a consequence damaged or unsatisfactory containers were frequently formed.

A further development of the machine described in U.S. Pat. No. 4,010,021 is described in U.S. Pat. No. 4,255,179. In this later machine, the parisons were made, as is conventional in an I.S. section, in an inverted position and transferred by a conventional invert mechanism to the intermediate jaws. However this machine suffered from the same disadvantages as the machine of U.S. Pat. No. 4,010,021.

A further attempt to solve the problem was the so-called R.I.S. machine, the principle of whose operation is described in U.S. Pat. No. 4,343,644. In a section of this machine, parisons are made in a conventional I.S. machine parison forming station, and are then inverted by a conventional neck-ring mechanism and received by a first of a pair of sets of blow moulds arranged on a turret. After transfer, the blow moulds are closed about the parison, and the neck-rings caused to release the parisons and to return to the parison forming station. The turret is then rotated to bring the first set of blow moulds into a final forming station, bringing the second set of blow moulds into position to receive the next set of parisons. It was intended that each set of parisons would reheat in the closed blow moulds and could then, at a suitable time later in the cycle, be blown into final containers. In practice it was found that the parisons enclosed by the blow moulds had reheated to such an extent that rotation of the turret would cause distortion of the parisons within the blow moulds, even though, in general, sufficient reheating to enable the parisons to be satisfactorily blown had not occurred. Consequently it proved necessary to begin the blowing operation before the turret began its rotation thus restricting the time available for reheating unless the cycle time was undesirably increased.

It is one of the objects of the present invention to provide a section of an I.S. machine in which adequate reheating of a parison can take place without risking damage to the parison or involving an undesirably long cycle time.

BRIEF STATEMENT OF THE INVENTION

The present invention provides as one of its features a section of an individual glass forming machine comprising
 blank station at which a gob of glass is formed into a parison
 an intermediate station at which reheating of the parison may occur
 and a final forming station at which a container is finally formed
 said blank station, said intermediate station and said final forming station all lying in a straight line along a centre line of the section
 a parison mould mechanism at the blank station comprising means for forming a gob of glass into a parison
 an invert mechanism comprising neck ring members arranged to engage a finish end portion of a parison formed by the parison mould mechanism and to transfer said parison to the intermediate station
 a blow mould mechanism comprising blow mould members adapted to form a mould cavity and means for opening and closing said blow mould members
 means for moving the blow mould mechanism linearly between the intermediate station and the final forming station
 means for closing the blow mould members about a parison at the intermediate station and
 means for opening the blow mould members to allow removal of a finally formed container at the final forming station.

The present invention provides as another of its features a section of an individual section glass forming machine comprising
 a blank station at which a gob of glass is formed into a parison
 an intermediate station at which reheating of the parison may occur
 and a final forming station at which a container is finally formed
 said blank station, said intermediate station and said final forming station all lying in a straight line along a centre line of the section
 a parison mould mechanism at the blank station comprising means for forming a gob of glass into a parison
 an invert mechanism comprising two neck ring mechanisms arranged to operate alternately to engage finish end portions of parisons formed by the parison mould mechanisms at the blank station and to transfer said parisons to the intermediate station.

There now follows a description of a section of an I.S. section embodying the invention to be read with reference to the accompanying drawings

BRIEF DESCRIPTION OF THE DRAWINGS

FIG. 1 shows a plan view of a section embodying the invention, somewhat diagrammatically, with some mechanisms omitted for clarity

FIGS. 7a & 7b show plan views of parts of the section in two different stages of operation FIG. 10 shows a timing diagram of operation of the section in which a comparatively short period is allowed for reheating of the parison.

DESCRIPTION OF THE PREFERRED EMBODIMENT

Figure 3:
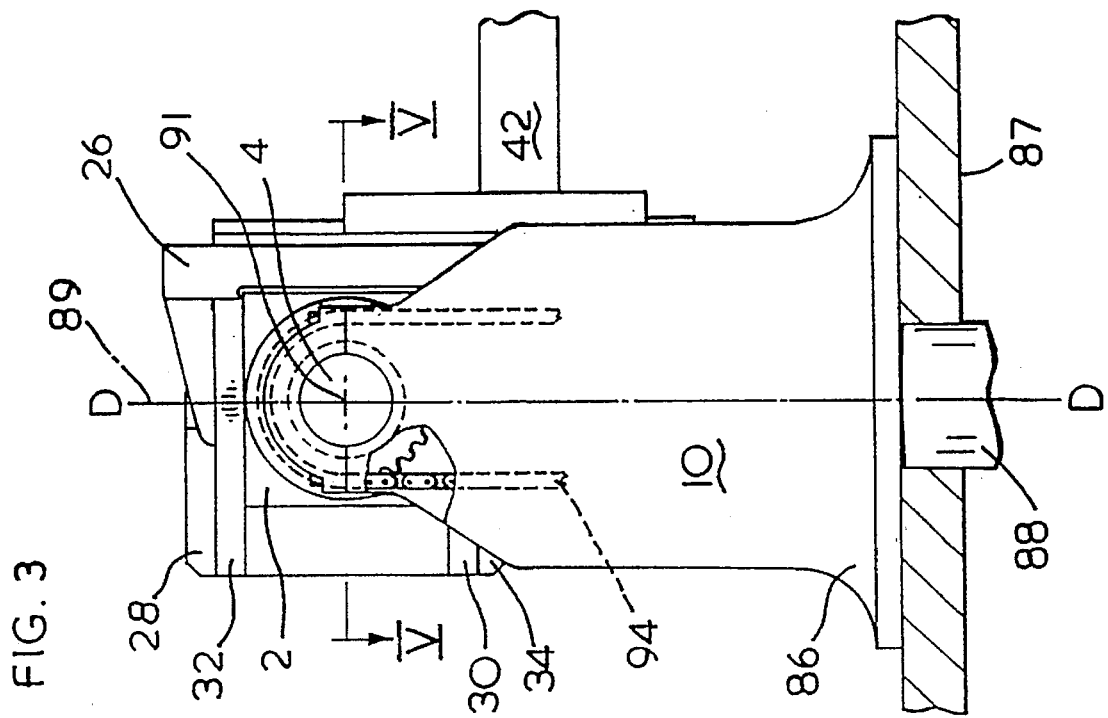
FIG. 3 shows a side view of the neck-ring mechanism

FIG. 1 shows somewhat diagrammatically a section of an individual section glass forming machine with some mechanisms in particular funnel, baffle, blowhead and take out mechanisms, omitted. Such a machine will comprise a number of such sections arranged side by side and arranged to operate out of phase with each other so that a continuous supply of formed glass containers is provided by the machine. I.S. machines comprising up to 12 sections each are now used commercially.

The section comprises a blank station A at which a charge of glass supplied from conventional gob forming and distribution devices may be formed into parisons in parison moulds of a parison mould mechanism. The illustrated section is a 'double gob' section, that is to say it is adapted to operate on two gobs at a time, and thus comprises two parison moulds 1,3, each comprising two parison mould members 1a, 1b, 3a, 3b which are of conventional construction, being movable between an open and a closed position about a pivot 5.

The section also comprises an invert mechanism 9 for transferring formed parisons from the blank station A to an intermediate station B at which, as will be explained, reheating of the parisons may take place, and a final forming station C in which containers are finally formed in blow moulds 11 comprising blow mould members 13 adapted to form blow mould cavities 15.

It will be noted that the three stations A, B and C lie in a straight line along a centre line X—X of the section.

The invert mechanism 9 comprises two neck-ring mechanisms 17 and 19 which operate alternately to transfer parisons from the blank station A to the intermediate station B. The neck ring mechanisms 17 and 19 are constructed substantially as described in U.S. Pat. No. 5,547,485 to which reference should be made for a detailed description, and the neck-ring mechanism 17 will now be described with reference to FIGS. 2 & 3, it being understood that the mechanism 19 is generally similar.

The neck-ring mechanism 17 comprises a supporting member in the form of a block 2 comprising opposed circular trunnions 4,6 which are supported in bearings 8 on brackets 10,12 so that the block 2 can be rotated about a horizontal invert axis 14 (shown by Y—Y in FIG. 2) between invert and revert positions.

Figure 4:
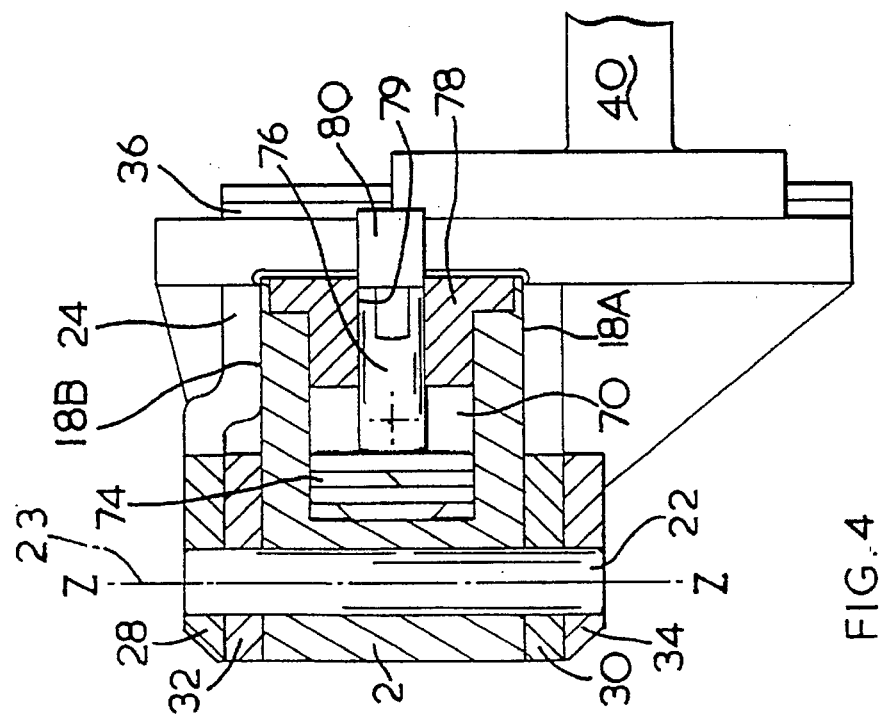
FIG. 4 shows a view of a section along IV—IV of FIG. 2
Figure 6:
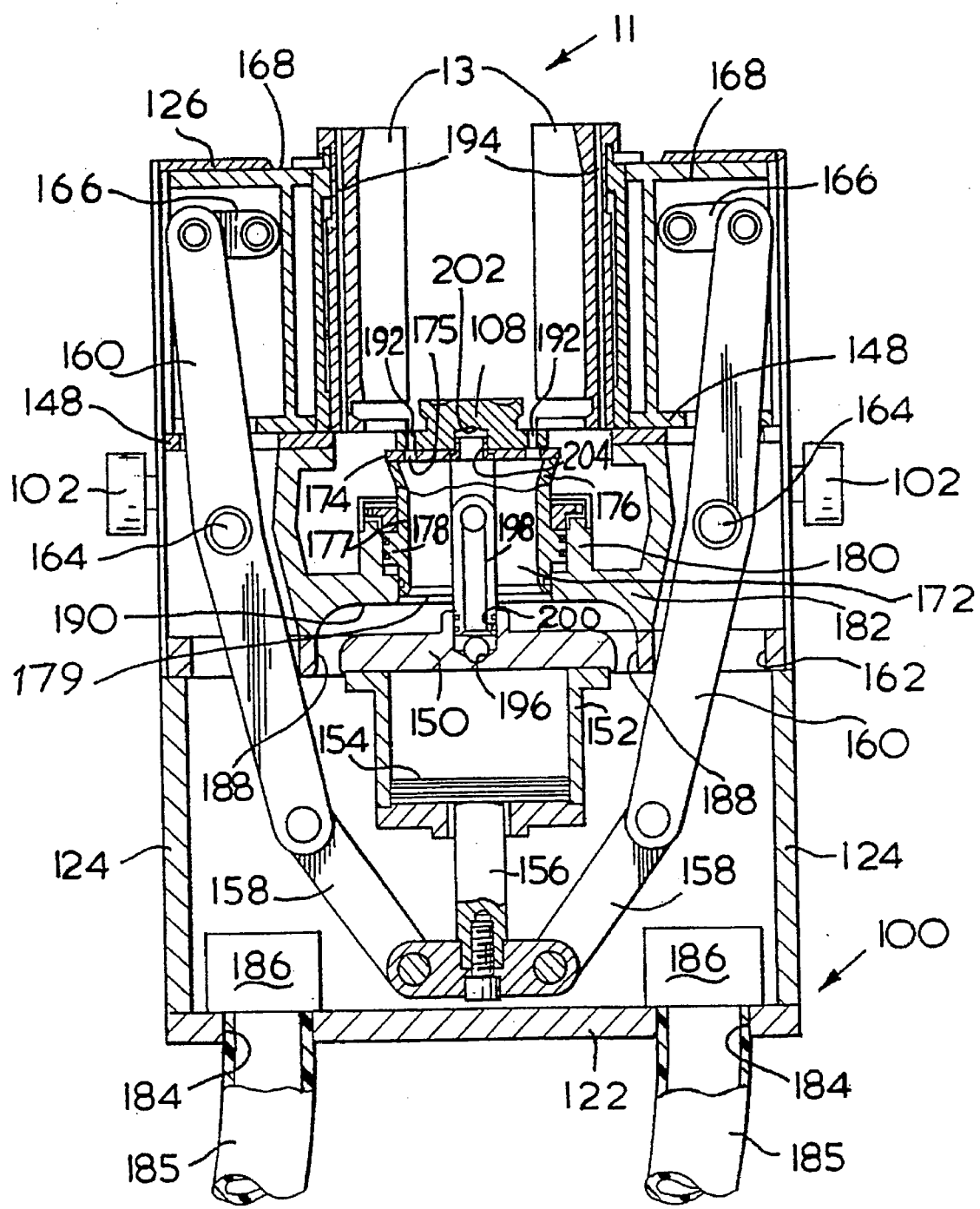
FIG. 6 shows, in transverse section and somewhat diagrammatically, a blow mould mechanism of the section supported in a carriage

When the block 2 is in a first, revert, position (as shown in FIGS. 3 and 4) a plane lower face 18A and a plane upper face 18B of the block 2 are horizontal.

The block 2 supports a shaft 22 whose axis 23 (shown as Z—Z in FIG. 4) is perpendicular to the face 18A and is thus vertical when the block 2 is in its revert position.

The neck-ring mechanism 17 comprises two neck-ring supporting members 24, 26 which are mounted on the shaft 22 for angular movement about the axis 23. The member 24 comprises lugs 28 and 30, and the member 26 lugs 32 and 34 by which they are supported on the shaft 22, the lugs 30 and 32 being located against the plane faces 18A and 18B of the block 2 and the lugs 28 and 34 lying respectively against and outside the lugs 32 and 30.

The supporting members 24, 26 each comprise a tongued locating member 36, 38 respectively. Neck-ring arms 40,42 having locating T slots 44,46 respectively are positioned on the members 36,38 and clamped in position at the desired height.

Figure 2:
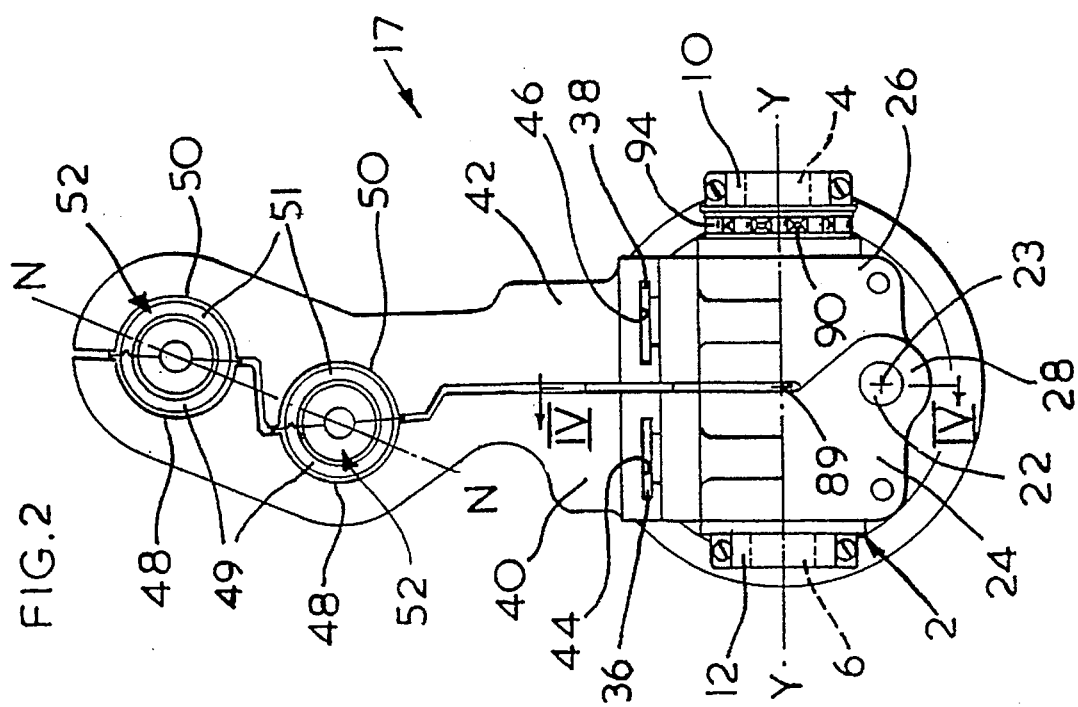
FIG. 2 shows a plan view of a neck-ring mechanism of the section

The neck-ring arm 40 comprises two semicircular neck-ring supports 48,48 and the neck-ring arm 42 two similar neck-ring supports 50,50. Each neck ring support 48,48 holds a neck ring mould-half 49,49. Similarly each neck ring support 50,50 holds a neck ring mould half 51,51. When the neck-ring arms are in a closed condition, as shown in FIG. 2 two complete neck-ring moulds providing apertures 52,52 are provided. It will be understood that, according to the configuration of the machine in which the neck-ring mechanism is to be used, the neck-ring arms may comprise one or a plurality of neck-ring supports.

If there is more than one neck-ring support, axes of the neck-ring apertures lie in a plane [N—N in FIG. 2] and as can be seen this plane is inclined at an angle, specifically in the illustrated mechanism 67.5°, to the axis Y—Y about which the neck-ring arms 40,42 rotate.

Figure 5:
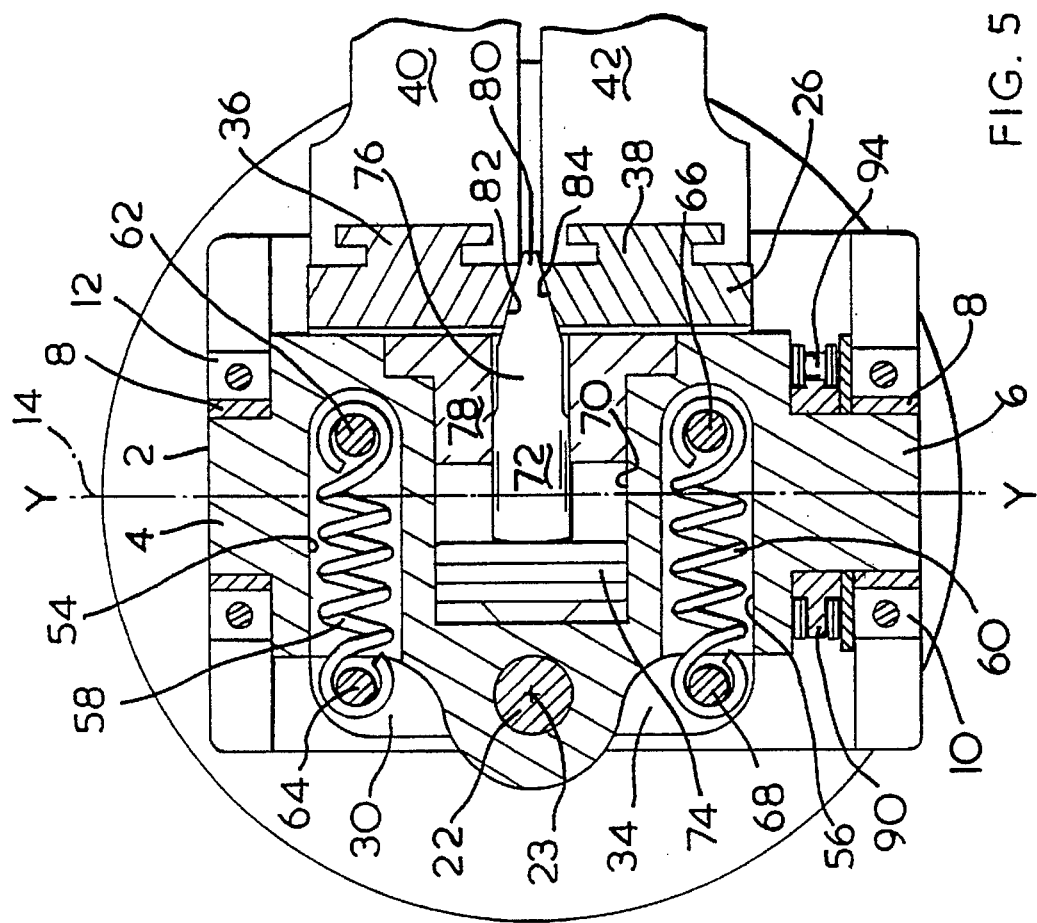
FIG. 5 shows a view of a section along V—V of FIG. 3

The mechanism comprises means for moving the neck-ring arms 40,42 towards and away from each other between open and closed conditions. The block 2 comprises two bores 54,56 and strong tension springs 58,60 extend respectively between a pin 62 in the bore 54 and a pin 64 secured between the lugs 28 and 30 and between a pin 66 in the bore 56 and a pin 68 secured between the lugs 32 and 34. As can be seen from FIG. 5 these springs 58,60 act to urge the neck-ring arms 40,42 into their closed condition.

In a central bore 70 of the block 2 is mounted a piston 72 comprising a head 74 and a piston rod 76. The bore 70 is closed by a bushing 78 having a central bore 79 through which the rod 76 passes. The rod 76 comprises a tapered end portion 80 which engages cam faces 82,84 on the supporting member 24,26.

Air under pressure is supplied to the bore 70 on both sides of the piston head 74 through bores (not shown) in the block 2.

It can be seen that when compressed air is supplied to the left hand portion of the bore (viewing FIGS. 4 and 5) the piston 72 is forced outwardly and the tapered end portion 80 bearing against the cam faces 82 and 84 forces the supporting members 24,26 and thus neck-rings arms 40,42 apart from their closed condition into an open condition against the action of the springs 58 and 60. Reversal of the compressed air supply withdraws the piston 72 and the springs 58 and 60 act to return the neck-ring arms 40,42 into their closed condition.

The brackets 10 and 12 are integral with a base 86 which rests against a top plate 87 of the machine and is attached to a vertical shaft 88 which is rotatably mounted in the machine about a vertical axis 89 (shown as D—D in FIG. 3).

Secured to the trunnion 4 between the bracket 10 and the block 2 is a chain wheel 90 which is driven by a chain 94.

Movement of the chain 94 thus rotates the neck-ring arms 40 and 42 about the axis Y—Y between revert and invert positions.

In the operation of the section, as will be described in more detail later, parisons are formed at the blank station A in the parison moulds 1 and 3 with finish end portions in contact with the neck-ring mould halves 49,51 of one of the neck-ring mechanisms 17 and 19. These mechanisms operate alternately to transfer the formed parisons from the blank station A to the intermediate station B where the parisons are positioned in the blow mould cavities 15 formed by the blow mould members 13 of the blow moulds 11.

The blow moulds 11 are shown diagrammatically in FIGS. 1, 6, 7 and 8. A blow mould mechanism, comprising means for opening and closing the blow mould members (Figure 6) is mounted in a carriage 100 which is supported by rollers 102 on a guide way 104 which is secured in a frame 110 of the section. The carriage 100 is arranged to be moved between an intermediate position, in which it is at the intermediate station B, and a final position, in which it is at the final forming station C, by a piston and cylinder device 106. The blow mould members 13 are supported by the mould opening and closing mechanism, by which they are moved between mould open (as shown on the right hand side of FIGS. 1, 7A and 7B) and mould closed positions (as shown on the left hand side of FIGS. 1, 7A and 7B). In the mould closed position the blow mould members 13 form a mould cavity 15 in conjunction with a base plate 108.

As will appear, the carriage 100 is in the form of a closed box and air is supplied to the carriage through flexible bores 185 to provide air for cooling the mould member 13, and vacuum is supplied to the carriage through a flexible bore (not shown) to provide for the supply of vacuum to the mould cavities.

The mould opening and closing mechanism (FIG. 6) is generally similar in construction to the blow mould opening and closing mechanism described in U.S. Pat. No. 4,810,278.

The carriage 100 is provided by a base plate 122, two side walls 124,124, and end plates (not shown) which provide, together with the mould members and a top plate 126, an enclosed box. A cross member 150 is supported between the side walls 124,124 and on its underside supports a vertically extending cylinder 152. A piston 154 is movable in the cylinder 152 to provide a piston and cylinder assembly. The piston 154 is fixed to a downwardly-extending piston rod 156 which is pivotally connected to four links 158. Each link 158 is pivotally connected to one of four levers 160 which extend upwardly two on each side of the cylinder 152. Each lever 160 passes through a hole 162 in the cross member 150 and is pivotally mounted on a longitudinally-extending rod 164 supported by the end walls of the carriage 100. There are two rods 164, one on each side of the carriage with two of the levers 160 mounted on each. The upper end portion of each lever 160 is pivotally connected to a link 166 which is pivotally connected to one of two mould member supports 168 of the moulding mechanism which are mounted for sliding movement towards or away from one another on plates 148 which are secured to a frame member 182. Operation of the piston and cylinder assembly 152, 154 to move the piston 154 downwardly causes the lower end portions of the levers 160 to be pulled towards the cylinder 152 so that the supports 168 are moved apart (to the condition shown in FIG. 6). Operation of the assembly 152,154 in the opposite direction causes the supports 168 to be moved towards one another.

The blow mould members 13 are each mounted on one of the supports 168 in a conventional manner. Each blow mould also comprises a base plate 108. The mould members 13 are movable, by movement of the supports 168 into engagement with one another and the base plate 108 to define mould cavities and away from one another, again by movement of the supports 168 to allow removal of moulded glass articles.

There are thus, two base plates 108 which are supported on a supporting plate 174 of the moulding mechanism.

The mould mechanism in the carriage 100 also comprises a plenum chamber 172 extending downwardly from the supporting plate 174. This plenum chamber 172 is arranged to supply air to each of a plurality of passages 175 defined by and passing through the supporting plate 174. The air is supplied to each passage 175 from the plenum chamber at substantially the same pressure. The plenum chamber comprises tapering walls 176 extending downwardly from the supporting plate 174 and a tubular portion 177. The tubular portion 177 extends downwardly and at its lower end defines an entrance 179 of the plenum chamber. The tubular portion 177 is formed as a tubular extension extending upwardly and downwardly from a piston 178 of a piston and cylinder assembly. The piston and cylinder assembly, which also comprises a vertically-disposed cylinder 180, is operable pneumatically to raise the supporting plate 174 into a moulding position (shown in FIG. 6) or to lower the supporting plate 174 and the base plates 108 to allow removal of finally moulded containers from the mould cavities. The tubular portion 177 extends right through the cylinder 180 so that the entrance 179 is below the cylinder 180. The cylinder 180 is supported by the frame member 182 which is mounted on top of the cross member 150.

In order to provide cooling air to the blow mould members 13, two orifices 184 are formed in the base plate 122 so that cooling air can enter the carriage 100 from flexible hoses 185. On/off valves 186 are provided to control the duration of air entry. Air entering the carriage 100 passes through openings 188 in the cross member 150 and passages 190 formed between the cross member 150 and the frame member 182. The air then enters the entrance 179 of the plenum chamber 172, and arrives at the underside of the plate 174. From here, the air passes upwardly through the passage 175 defined by the plate 174. The air then passes upwardly through cooling passages in the mould members 13 which each have an entrance in a bottom surface of one of the mould members and extend upwardly through the mould members. Each cooling passage comprises a portion 192, extending through one of the base plates 108 and communicating with one of the passages 175 in the supporting plate 174, and a portion 194 provided in one of the mould members 13 and communicating with the portion 192 when the mould members engage one another and the base plate 108 in their closed condition. The base plates 108 are also connected to a vacuum passage 196 in the cross member 150 by a pipe 198 which is telescopically-received in a recess 200 in the cross member 150 which communicates with the passage 196. The pipe 198 passes upwardly through the tubular portion 177 and branches to enter recesses 202 in each of the base plates 108, adaptors 204 of conventional construction being provided in holes in the plate 174 for connecting the recesses 202 to the pipe 198.

The vacuum passage 196 is connected by a flexible pipe (not shown) and an on-off valve (not shown) to a supply of vacuum. Recesses 202 communicate with blow mould cavities 15 via passages not shown, drilled as is conventional in the base plates 108. When the on/off vacuum valve is open air within mould cavities 15 is drawn out through the recesses 202, pipe 198 and vacuum passage 196.

The operation of the section will now be described with particular reference to FIGS. 1, 6, 7 and 8.

FIG. 1, left-hand-side, shows the parts of the section in their positions at the beginning of a cycle, with the neck-ring mechanism 17 positioned with its neck-ring mould halves 49,51 in position under the parison moulds 1 and 3, the neck-ring mechanism 19 positioned with its neck-ring mould halves 49,51 in position at the intermediate station B, and with the blow moulds supported by the carriage 100 at the final forming station C.

The section comprises conventional baffle, funnel, plunger and blow-head mechanisms which are not shown, but whose construction and operation (except as specifically pointed out below) are conventional.

At the beginning of the cycle, two gobs are provided from gob forming and distribution means associated with the section (not shown) to the closed parison moulds 1 and 3 to form parisons by the conventional blow process. Thus, the gobs are supplied through a funnel which is positioned above the mould cavities, which are positioned over the neck-ring mould halves 49,51. The baffle is positioned against the funnel, settle blow and vacuum assist is provided to ensure the finish end portions of the parisons are properly formed in the neck-ring mould halves 49,51 the plunger forming a recess in the glass. The funnel and baffle are then removed, and the plunger withdrawn. The baffle is then replaced, and counter blow is applied to form the parisons, each having a neck-ring or finish end portion formed in contact with the neck-ring moulds 49, 51.

The baffle is then removed, the parison moulds 1,3 are opened and the neck ring mechanism 17 is moved simultaneously clockwise about axis D—D (shown as 89 in FIG. 3) and anti-clockwise about the axis Y—Y (shown in FIG. 2). The parisons are thus carried by the invert mechanism in a curved path not in a plane passing through the axis X—X but totally within the external boundary of the section, from the blank station A to the intermediate station B. By the time that neck ring mechanism 17 has lifted the parisons clear of the parison moulds 1,3 neck ring mechanism 19 has released its initially formed containers formed from the previous set of gobs at intermediate station B and partially returned to blank station A along a similar reverse path, stopping along this path if necessary. Therefore, as soon as the path is clear, neck ring mechanism 19 is positioned to move immediately fully back into blank station A ready to receive the next set of gobs to be formed into parisons. Thus the paths of the neck rings are such that one neck ring can move from the blank station to the intermediate station while the other is moving from the intermediate station to the blank station without interference between the two sets of neck rings. This enables the parison moulds 1,3 to be utilised for a greater proportion of each forming cycle than in a conventional machine contributing to an overall greater productivity.

Figure 8:
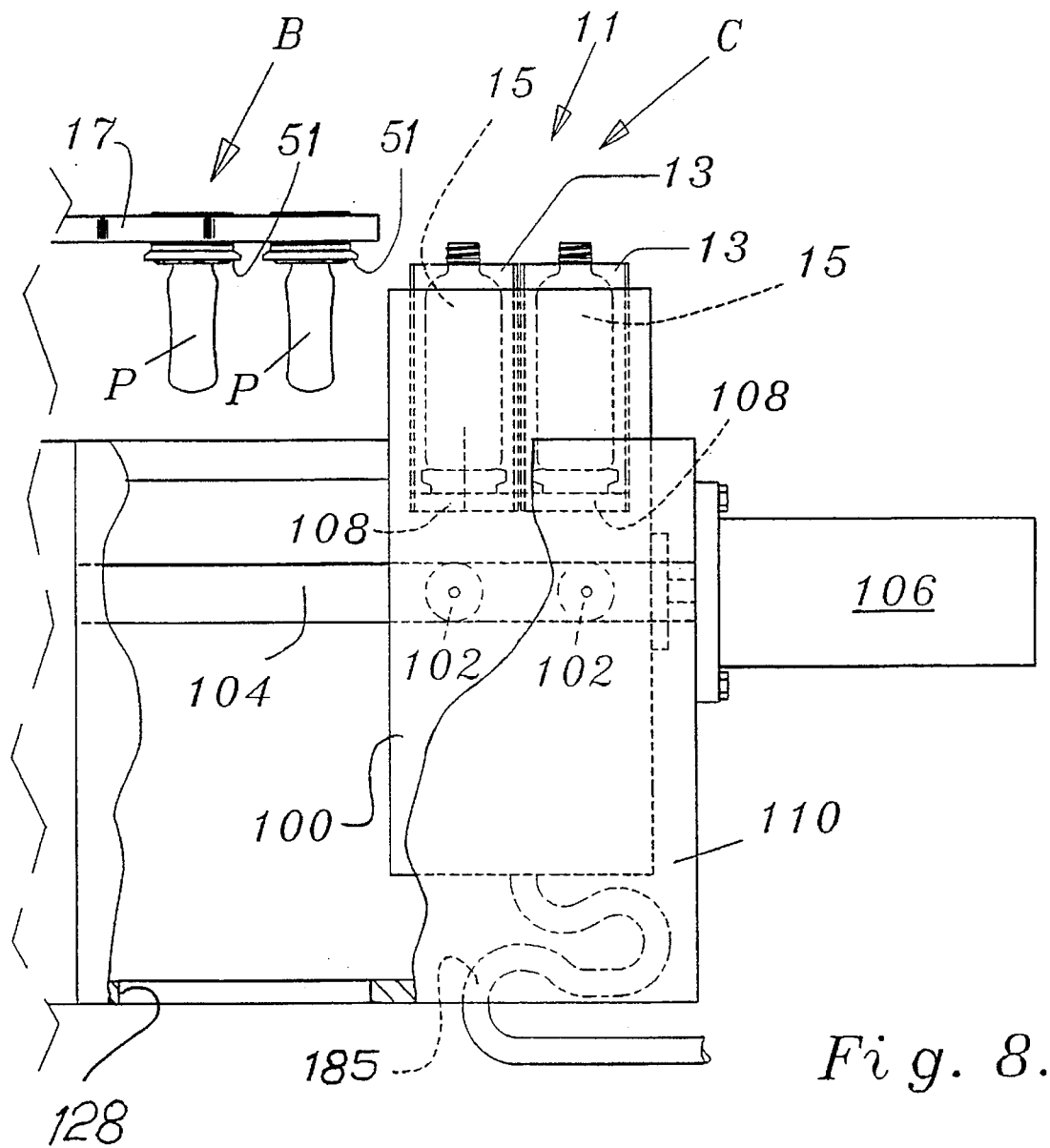
FIG. 8 shows a side view of an intermediate station and a final forming station of the section

FIG. 8 shows two parisons P supported by the neck-ring mould halves 49,51 (only 51 can be seen) of the neck-ring mechanism 17 at the intermediate station B. The parisons are supported here for an appropriate length of time to allow reheating of the parisons to take place. While this reheating is occurring, the blow moulds at the final forming station C open to release containers formed in the preceding cycle, and the carriage 100 is then moved by the piston and cylinder device 106 to carry the open mould members 13 from the final forming station C to the intermediate station B where the blow mould members are closed around the parisons P.

An opening 128 is provided in the frame 110 of the section below the intermediate station B. If for any reason (for example on starting up the section) the parisons at the intermediate station are not suitable or not needed for forming into fully formed containers, they may be rejected at the intermediate station by releasing them from the neck ring mechanism and allowing them to fall through the opening 128 into a cullet chute (not shown).

Once the mould members 13 are closed around the parisons, vacuum is applied to the mould cavities 15 via recesses 202, pipe 198 and vacuum passage 196 to provide an initial forming action on the glass of the parisons, to force the glass into contact with the interior surfaces of the blow mould cavities 15 to provide initially formed containers. The neck-ring arms 40,42 are then moved apart from their closed position by the action of piston 72. This releases from the neck-ring moulds 49,51 the finish end portions of the initially formed containers which are now supported in the blow moulds. The neck-ring mechanism 17 now begins its revert movement to carry the neck-ring moulds 49,51 back to blank station A.

If desired, a blow head (not shown) could be arranged to be brought down on top of the neck ring moulds 49,51 to allow blowing air to be applied to assist in the initial forming of the containers.

It will be appreciated that should the sequence described above prove to give an excessive amount of neck-ring contact time for any given container, an alternative sequence could be used in which the neck-ring moulds are opened as soon as the blow moulds are closed leaving the parisons supported by their finishes within the blow mould cavities 15 and the neck-ring mechanism 17 could begin its revert motion before the vacuum and/or blowing air is applied to initially form the containers.

The carriage 100 is then caused to move by the piston and cylinder device 106 to carry the initially formed containers from the intermediate station B to the final forming station C. While this movement takes place the vacuum applied to the mould cavities is maintained-and thus the initially formed containers are held firmly in the mould cavities and can move without any risk of distortion.

When carriage 100 reaches the final forming station C, a blowhead (not shown) of conventional construction is moved over the finish portions of the initially formed containers and air is blown into the initially formed containers to ensure that they are blown into their final shape, to enhance the contact between the glass of the containers and the interior surfaces of the mould cavities 15 and also to cool the now fully formed containers into a shape retaining condition.

The cycle is completed by removal of the blow-head, engagement of the finish end portions of the containers by a takeout mechanism (not shown), opening mould members 13 and removing the fully formed containers to a conventional dead-plate from which, after further cooling, they are pushed out onto a conveyor. Should the takeout mechanism be of a conventional type which takes the containers out from final forming station C in an arcuate path it only has to raise the containers a short distance upwards before the bases of the containers are clear of the base plates 108 and the carriage 100 can start its motion towards intermediate station B ready for mould members 13 to receive the next set of parisons. Alternatively, a downward movement of the base plates 108 can be obtained by the motion of the piston and cylinder device 178, 180 to allow the containers to be removed horizontally from final forming station C.

The single cycle of the section just described will be understood to provide a method in which the following steps are carried out:

(a) supplying a gob of glass to a parison mould at the blank station of the section;

(b) forming a downwardly facing parison at the blank station with a finish end portion of the parison in contact with a neck-ring mould of an invert mechanism;

(c) inverting the parison held by the neck-ring mould to transfer it to the intermediate station of the section;

(d) closing blow mould members about the parison at the intermediate station, performing an initial forming operation on the parison to force it into contact with the interior surface of the blow mould members to provide an initially formed container and releasing the parison from the invert mechanism;

(e) moving the blow mould members linearly from the intermediate station to the final forming station and performing a final forming operation to produce a formed container; and (f) opening the blow mould members and removing the formed container.

The first steps (a), (b) and (c) provide a first cycle portion: the steps (d), (e) and (f) provide a second cycle portion. There is a period during which the parison is stationary at the intermediate station and is reheating, between the first and second cycle portions. This reheat period may be chosen to be of an appropriate length of time: the relative timing of the steps of the first cycle portion are adjustable independently of the relative timing of the steps of the second cycle portion, and the reheat period is adjustable independently of the relative timing of either of the two cycle portions.

Figure 9:
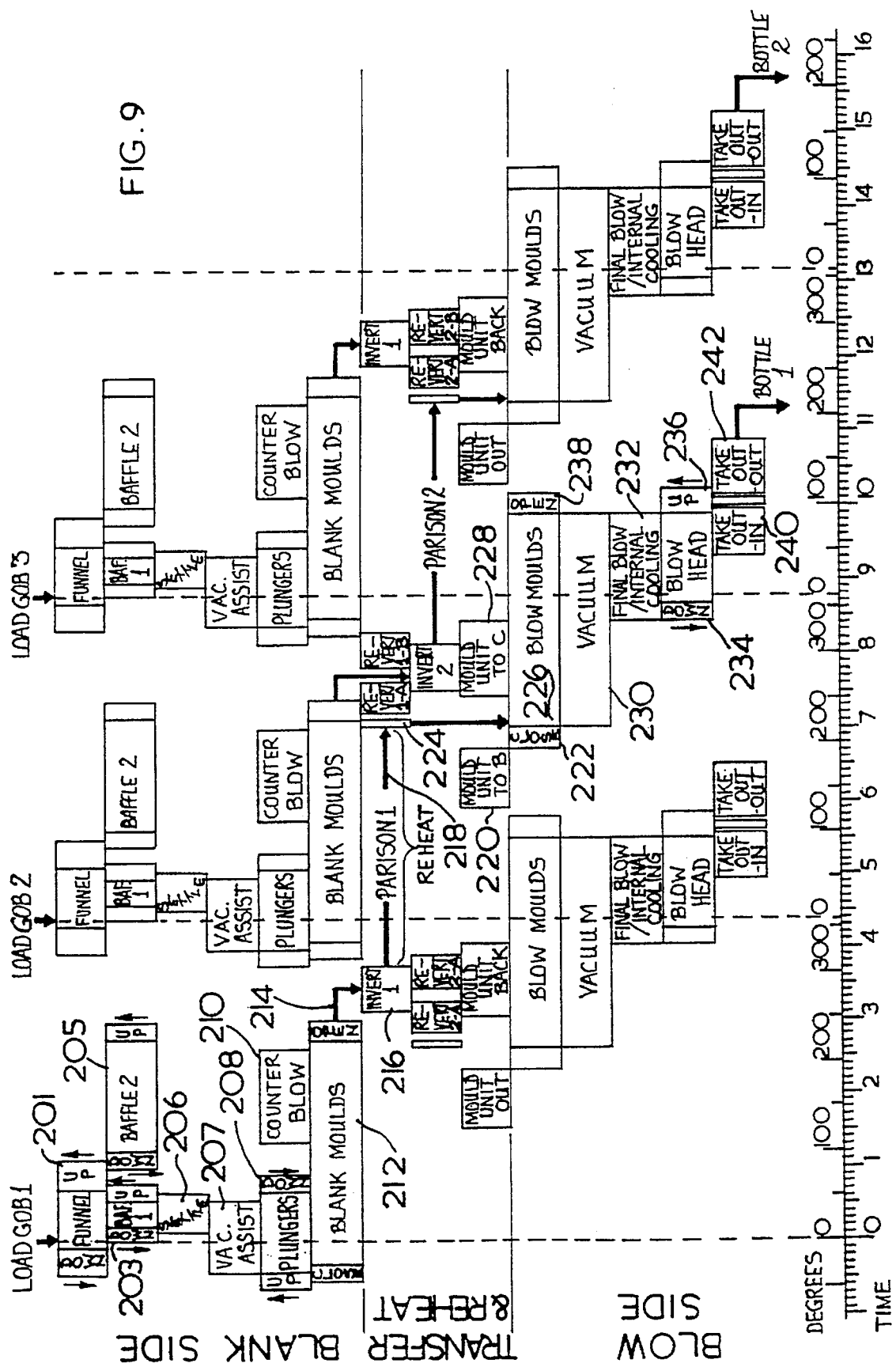
FIG. 9 shows a timing diagram of operation of the section in which a comparatively long period is allowed for reheating of the parison

FIGS. 9 and 10 show, diagrammatically a cycle of the section with maximum and minimum reheat respectively. The cycles are shown using the blow and blow process.

201 indicates the movement of the funnel;
203 indicates the first movement of the baffle;
205 indicates the second movement of the baffle;
206 indicates the settle blow;
207 indicates the vacuum assist;
208 indicates movement of the plunger in the forming of the parison;
210 indicates the counter blow to blow the glass into a parison;
212 indicates the closing and opening of the blank or parison moulds;
214 illustrates the invert movement of the parison from the blank station A to the intermediate station B;
216 illustrates the invert movement of the neck-ring mechanism;
218 illustrates the parison stationary at the intermediate station and reheating;
220 illustrates the carriage and blow mould members moving from the final forming station C to the intermediate station B;
222 illustrates the blow mould members closing around the parison at the intermediate station B;

224 illustrates the neck-ring moulds opening to release the neck-ring end portion of the parison;

226 illustrates the blow mould members in closed condition;

228 illustrates the carriage and blow mould members moving from the intermediate station B to the blow station C;

230 illustrates vacuum being applied to the blow mould members beginning when the blow mould members close;

232 illustrates the final blowing and internal cooling of the containers through a blow-head which moves down at;

234 and up at;

236

238 illustrates the mould members opening;

240 illustrates the takeout mechanisms moving in to grasp the formed containers;

242 illustrates the takeout moving to carry the formed containers to the dead plate. from which they are pushed out onto a conveyor;

It can be seen that the movements of the mechanisms prior to the time 218 when the parison is stationary and reheating is the same in FIG. 9 as in FIG. 10, and again the movements of the mechanisms subsequent to the reheating time 218 is the same in FIG. 9 as in FIG. 10. If the maximum reheat period is allowed, the section is in fact operating on three sets of gobs at the same time—while one set of gobs is being formed into parisons, a second set of gobs is reheating at the intermediate station and a third set of gobs is being finally formed into containers in the blow moulds. If the minimum reheat is allowed, only two sets of gobs are operated upon at the same time—one set of gobs being formed into parisons and being transported to the intermediate station while another is being removed from the intermediate station and being finally formed into containers.

There are several variations which can be made to the sequences shown in FIGS. 9 and 10. Firstly, as will be realised, the parison could be formed by a pressing process rather than a blowing process as just described. Secondly, if the section is modified so that the blow-head is arranged to move from the intermediate section to the final forming station, blowing into the parison to cool it internally and to form it into its final shape can begin at the intermediate station and continue at the final forming station. While, because it avoids an extra downward and upward movement of the blow-head, it is preferred to begin this blowing operation after the neck-ring supports have released the parisons and moved out of the way, it would be possible, if desired, to arrange for the initial blowing to take place through the neck-ring support members, and then to remove the blow-head, move the neck-ring support members out of the way, move the blow-head back into position in contact with the mould members and complete the blowing operation, the blow-head moving with the moulds from the intermediate to the final forming station.

I claim:

1. An I.S. machine comprising at least one section including a blank station having mold means for forming a gob of molten glass into a parison, a blow mold having blow mold members displaceable between open and closed positions, invert means for transferring a parison from said blank station to an intermediate station, means for locating said blow mold at said intermediate station with said blow mold members at the open position, means for displacing said blow mold members from the open position to said closed position when a parison has been transferred to said intermediate station and said blow mold is located at said intermediate station with said blow mold members in the open position, and means for linearly displacing said blow mold from said intermediate station to a final forming station when said blow mold members have been positioned at said closed position around a parison, said blank station, said intermediate station and said final forming station being arranged in a straight line.

2. An I.S. machine according to claim 1, wherein said blow mold further includes means for applying a vacuum to a parison when said blow mold members are closed around the parison.

3. An I.S. machine according to claim 2, wherein said means for applying a vacuum comprises means for applying a vacuum when said blow mold is located at said intermediate station.

4. An I.S. machine according to claim 3, wherein said means for applying a vacuum comprises means for applying a vacuum while said blow mold, with the parison therein, is linearly displaced from said intermediate station to said final forming station.

5. An I.S. machine according to claim 3, wherein said means for applying a vacuum comprises means for applying a vacuum while said blow mold, with the parison therein, is located at said final forming station.

* * * * *